Patented Oct. 22, 1935

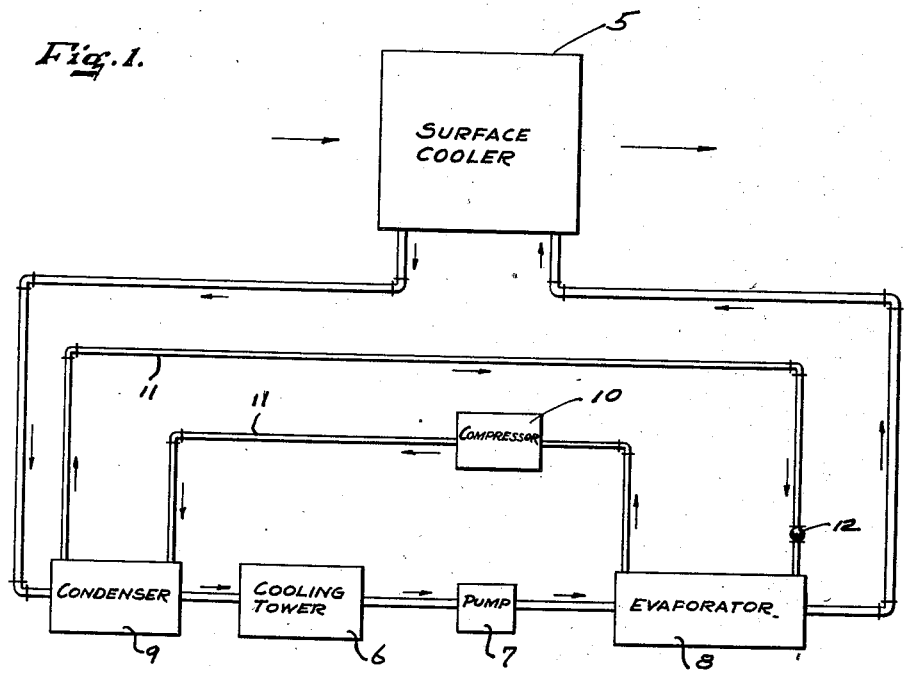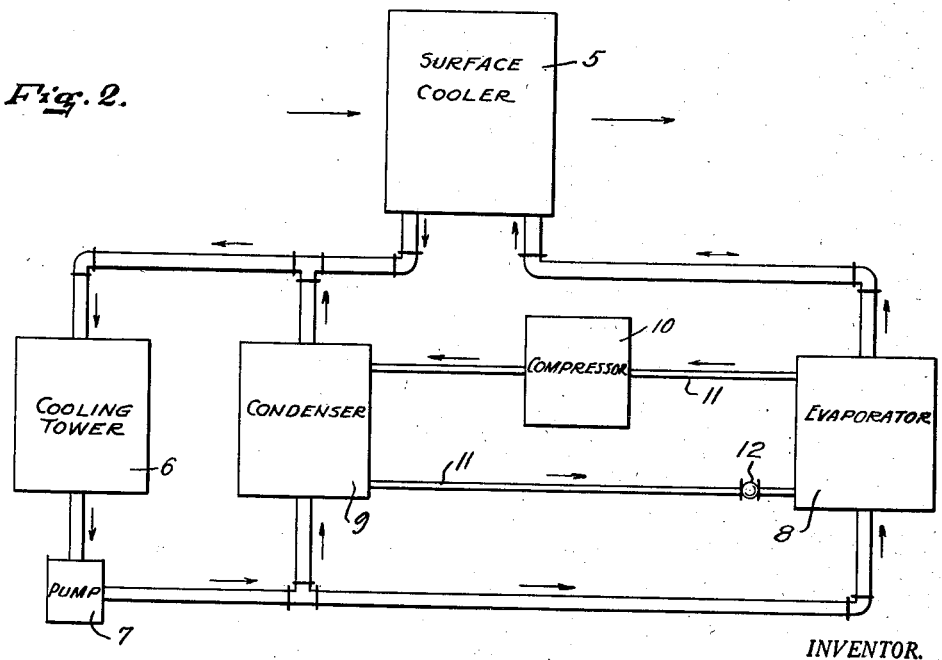

2,018,453

UNITED STATES PATENT OFFICE 2,018,453

COOLING OF AIR BY REFRIGERATION

Matthew M. Lawler, Beverly Hills, Calif., assignor to The Cooling and Air Conditioning Corporation, Boston, Mass., a corporation of New York Application March 6, 1934, Serial No. 714,219

4 Claims. (Cl. 62—129)

This invention relates to refrigeration systems for use in the conditioning of air and relates more particularly to the cooling of air with water, cooled through evaporative cooling, together with mechanical refrigeration.

Possibly the greatest objection to the cooling of air in summer for air conditioning purposes is the high cost of refrigeration where the cooling is accomplished by some type of mechanical refrigeration. Mechanical refrigeration is necessary where well or lake water of sufficiently low temperature is not available.

In the western portion of the United States and in other areas where the wet bulb temperature of the air is low, water may be cooled to a fairly low temperature by a cooling tower, and this cold water may be used to cool air for comfort purposes.

According to this invention, a refrigeration system for the cooling of air embodies apparatus for combined evaporative and mechanical cooling of water which is used for cooling the air. In one embodiment of the invention, extended surface cooling coils are used for cooling the air which is forced over the coils by a fan or blower. A cooling tower is provided and water, which is later circulated through the cooling coils, is first sprayed within the cooling tower where it is cooled to a lower temperature. It is then passed through the evaporator of the refrigeration plant, where it is cooled an additional amount. It is then circulated through the extended surface cooling coils where its temperature is raised, and is next circulated through the condenser of the refrigeration plant where its temperature is raised an additional amount. From the condenser it is returned to the cooling tower where it is again sprayed. In this embodiment of the invention, there is one continuous water circuit which passes in series through the extended surface cooler, the condenser, cooling tower, and evaporator.

In another embodiment of the invention, a single set of extended surface cooling coils are provided through which cooling water is circulated in one continuous circuit. The evaporator and condenser in this embodiment are, however, arranged in parallel instead of in series, as in the first described embodiment, an advantage of this being that increased refrigerating effect is produced in that the condenser water temperature is substantially lowered by provision of larger capacity in the cooling tower circuit.

An object of the invention is to cool air with water previously cooled by evaporative cooling.

Another object of the invention is to cool air by water cooled through evaporative cooling and by mechanical refrigeration.

Another object of the invention is to provide an air conditioning plant with evaporative cooling and cooling by mechanical refrigeration.

Other objects of the invention will be apparent from the following description taken in connection with the drawing.

Referring now to the drawing,

Fig. 1 is a diagrammatic illustration of one embodiment of the invention, combining evaporative cooling and cooling by mechanical refrigeration, the cooling water being passed in one continuous circuit through air cooling coils, the condenser, refrigerating unit, and the cooling tower;

Fig. 2 is a diagrammatic illustration of another embodiment of the invention, similar to the embodiment illustrated by Fig. 1, with the exception that the evaporator and condenser are placed in parallel instead of in series.

Referring now to Fig. 1, the air to be cooled passes through the cooling chamber 5, as indicated by the arrows. The cooling chamber 5 contains a well known type of extended surface cooling coils. In a typical installation, it will be found that cooling water will be taken from the pan of the cooling tower 6 at a temperature of about 76° F., circulated by the pump 7, through the evaporator 8, where it is cooled to about 65° F., and then passes through the cooling compartment 5 where its temperature is raised to from 80° to 85° F. Water is then circulated through the condenser 9 of the refrigerating plant, where its temperature is raised another 15° F. From the condenser it is circulated again to the cooling tower, where it is again cooled back to approximately 76° F. The compressor 10 compresses any suitable refrigerant, such as ammonia, and circulates it through the pipes 11, through the condenser 9, where heat is extracted by the condenser water, and then through the expansion valve 12 and into coils in the evaporator 8, around which the water to be cooled circulates. In this embodiment of the invention, there is one continuous cooling water circuit and one continuous refrigeration circuit. It was found that in an installation embodying this invention, a saving in refrigeration of about 35% was obtained through the use of this evaporative cooling combined with cooling by mechanical refrigeration. Omitting the evaporative cooling feature, in one particular installation, 14.4 tons of refrigeration effect was required, and with the evaporative cooling according to this invention, only 9 tons of mechanical refrigeration effect was required.

In one installation, it was found that by adding the cooling coils through which the water, cooled by evaporative cooling, is circulated, the capacity of the refrigerating plant was reduced from 29 tons to 16½ tons, which reduced the equipment required and the operating expense.

The embodiment of the invention illustrated by Fig. 2 is similar to that described in connection with Fig. 1, except that the evaporator and condenser are arranged in parallel instead of in series. For this reason, the same reference characters are applied to the apparatus of Fig. 2 as are applied to the corresponding apparatus of Fig. 1. By arranging the evaporator 8 and condenser 9 in parallel instead of in series, a pump and water piping system of approximately double capacity and a cooling tower of approximately double capacity must be provided. So, cooling tower 6, condenser 9, pump 7, cooler 5, and connecting piping of Fig. 2 have approximately twice the capacity of the same apparatus of Fig. 1. While equipment of greater capacity is required by the arrangement of Fig. 2, it has been found that by placing the evaporator and condenser in parallel, the condenser water can be cooled approximately an additional 8° which provides better operating conditions and reduces the amount of power required to operate the refrigerant compressor. Under certain conditions, it has been found that by arranging a larger capacity condenser and cooling tower in parallel, the cost of additional capacity is more than compensated for by the saving in power required to operate the system and the reduction of condenser surface and compressor displacement ordinarily required.

Another advantage of an air conditioning system, according to the present invention, is that during several months of the year, that is, in the early summer and early fall, the desired cooling effect may be obtained by discontinuing the refrigerating plant and circulating water cooled by evaporative cooling through the cooling coils in the surface coolers. So, the compressor and its associated equipment is operated only during mid-summer, with the result that the total cost in producing the desired air cooling is comparatively low.

While the several embodiments of the invention have been described in connection with extended surface coils for cooling the air, it should be understood that the invention comprehends also the use of air washers, extended surface coolers having been referred to merely by way of illustration. The same cooling effect may be obtained with air washers as with surface coolers. With the latter, a somewhat lower relative humidity is obtained.

Whereas several embodiments of the invention have been described for the purpose of illustration, it should be understood that the invention is not limited to the details described, since many modifications may be made by those skilled in the art without departing from the spirit of the invention.

What I claim is:

1. Air conditioning apparatus comprising a cooling compartment, a cooling tower for evaporative cooling of the water, a refrigeration plant including a condenser and an evaporator, and a water circulation circuit including said compartment, said cooling tower, and said evaporator in series, and said cooling compartment and said condenser in parallel with respect to flow from said cooling tower.

2. Air conditioning apparatus comprising means for the cooling of air, a cooling tower for the evaporative cooling of water, means for circulating a portion of the water from said tower to said means, a refrigeration plant including a condenser for additionally cooling said means, and means for circulating another portion of water from said cooling tower through said condenser.

3. Air conditioning apparatus comprising a cooling compartment, a cooling tower for evaporative cooling of water, a refrigeration plant including a condenser and an evaporator, and a water circulation circuit including said compartment, said tower and said evaporator in series, and said evaporator and said condenser in parallel with respect to flow from said cooling tower.

4. Air conditioning apparatus comprising a cooling compartment, a cooling tower in series relationship with said compartment for partially cooling water, a refrigeration plant for cooling water from said cooling tower to a lower temperature, and means for circulating the cold water through said compartment, said cooling tower, and said plant, all of the water recirculated from said compartment passing through said cooling tower.

MATTHEW M. LAWLER.